United States Patent
Chen et al.

(10) Patent No.: US 9,440,668 B1
(45) Date of Patent: Sep. 13, 2016

(54) UMBRELLA FOLDING TABLE CART

(71) Applicants:Zhaosheng Chen, El Monte, CA (US); Yishun Chen, El Monte, CA (US)

(72) Inventors: Zhaosheng Chen, El Monte, CA (US); Yishun Chen, El Monte, CA (US)

( * ) Notice: Subject to any disclaimer, the term of this patent is extended or adjusted under 35 U.S.C. 154(b) by 0 days.

(21) Appl. No.: 14/929,746

(22) Filed: Nov. 2, 2015

(51) Int. Cl.
*B62B 3/02* (2006.01)
*B62B 3/10* (2006.01)

(52) U.S. Cl.
CPC *B62B 3/102* (2013.01); *B62B 3/02* (2013.01)

(58) Field of Classification Search
CPC .......... B62B 3/02; B62B 3/102; A47B 1/08; A47B 5/02; A47B 11/00; A47B 2031/008; A47B 31/00; A47B 3/06
See application file for complete search history.

(56) References Cited

U.S. PATENT DOCUMENTS

| | | | | |
|---|---|---|---|---|
| 5,380,022 A * | 1/1995 | Dennis | ...... | A47B 5/02 280/47.35 |
| 5,876,047 A * | 3/1999 | Dennis | ...... | B62B 3/007 280/47.35 |
| 7,762,363 B1 * | 7/2010 | Hirschfeld | ...... | B60K 1/04 180/65.1 |
| 7,909,148 B1 * | 3/2011 | Miller | ...... | A45C 9/00 190/11 |
| 8,453,771 B1 * | 6/2013 | Hirschfeld | ...... | B60L 8/003 180/19.1 |

\* cited by examiner

*Primary Examiner* — John Walters
*Assistant Examiner* — James Triggs
(74) *Attorney, Agent, or Firm* — Clement Cheng

(57) ABSTRACT

An umbrella folding table cart has a deployed position and a folded position. The folding cart has a folding table that receives an umbrella. The folding cart has four wheels including a pair of front wheels and a pair of rear wheels. A first table leaf, and a second table leaf are hinged to each other at a table support. A frame including a front wheel frame is connected to the pair of front wheels and a rear wheel frame is connected to the pair of rear wheels. The front wheel frame is hinged to the rear wheel frame at a front wheel frame upper hinge. The front wheel frame and the rear wheel frame have a hinged connection relative to each other.

15 Claims, 9 Drawing Sheets

UMBRELLA FOLDING TABLE CART

FIELD OF THE INVENTION

The present invention is in the field of umbrella folding carts.

DISCUSSION OF RELATED ART

A variety of different folding wagons and carts have been described in the prior art. The most related to this application being disclosed in U.S. Pat. No. 9,101,206 issued Aug. 11, 2015 by the same first inventor Zhaosheng Chen, the disclosure of which is incorporated herein by reference. In his prior application, Chen discloses a wagon having a frame suitable for pulling. What is needed is a cart structure suitable for both pushing or pulling.

SUMMARY OF THE INVENTION

An umbrella folding table cart has a deployed position and a folded position. The folding cart has a folding table that receives an umbrella. The folding cart has four wheels including a pair of front wheels and a pair of rear wheels. A first table leaf, and a second table leaf are hinged to each other at a table support. A frame including a front wheel frame is connected to the pair of front wheels and a rear wheel frame is connected to the pair of rear wheels. The front wheel frame is hinged to the rear wheel frame at a front wheel frame upper hinge. The front wheel frame and the rear wheel frame have a hinged connection relative to each other.

A first table leaf frame support and a second table leaf frame support respectively support the first table leaf and the second table leaf. The first table leaf frame support is generally horizontal in the deployed position, and the second table leaf frame support is generally horizontal in the deployed position. The first table frame support and the second table leaf frame support fold towards each other downwardly to a more vertical orientation when the folding cart is folded from the deployed position to the folded position.

The folding cart also has a front basket frame and a rear basket frame. The front basket frame has a hinged connection relative to the rear basket frame. The front basket frame is hinged to the front wheel frame at a front wheel frame middle hinge. The rear basket frame is hinged to the rear wheel frame at a rear wheel frame middle hinge. The front basket frame is hinged to the second table leaf frame support at a front basket frame upper hinge, and the rear basket frame is hinged to the first table leaf frame support at a rear basket frame upper hinge.

A rear basket frame hinge is formed on the rear basket frame and located between the rear wheel frame middle hinge and the rear basket frame upper hinge. The rear basket frame hinge folds so that the upper portion of the rear basket frame folds downward while a lower portion of the rear basket frame folds upward until the upper portion of the rear basket frame is more parallel to the lower portion of the rear basket frame.

A front basket frame hinge is formed on the front basket frame and located between the front wheel frame middle hinge and the front basket frame upper hinge. The front basket frame hinge folds so that the upper portion of the front basket frame folds downward while a lower portion of the front basket frame folds upward until the upper portion of the front basket frame is more parallel to the lower portion of the front basket frame.

A floor frame includes a front basket floor frame and a rear basket floor frame. The front basket floor frame is pivotally connected to the rear basket floor frame at a front basket frame lower hinge or at a rear basket frame lower hinge. The front basket floor frame is pivotally connected to the front wheel frame at a front wheel frame lower hinge. The front wheel frame lower hinge is below the front wheel frame middle hinge, which is below the front wheel frame upper hinge. The rear basket for frame is pivotally connected to the rear wheel frame at a rear wheel frame lower hinge. The rear wheel frame lower hinge is below the rear wheel frame middle hinge which is below the rear wheel frame upper hinge.

The front wheel frame is U-shaped having a pair of front wheel frame upper ends and the rear wheel frame is U-shaped having a pair of rear wheel frame upper ends. The pair of front wheel frame upper ends is pivotally connected to the pair of rear wheel frame upper ends.

A table support that connects between the pair of front wheel frame upper ends and between the pair of rear wheel frame upper ends is detachable from the frame. The first table leaf is hinged to the first table support and the second table leaf is hinged to the second table support.

Figure 1:
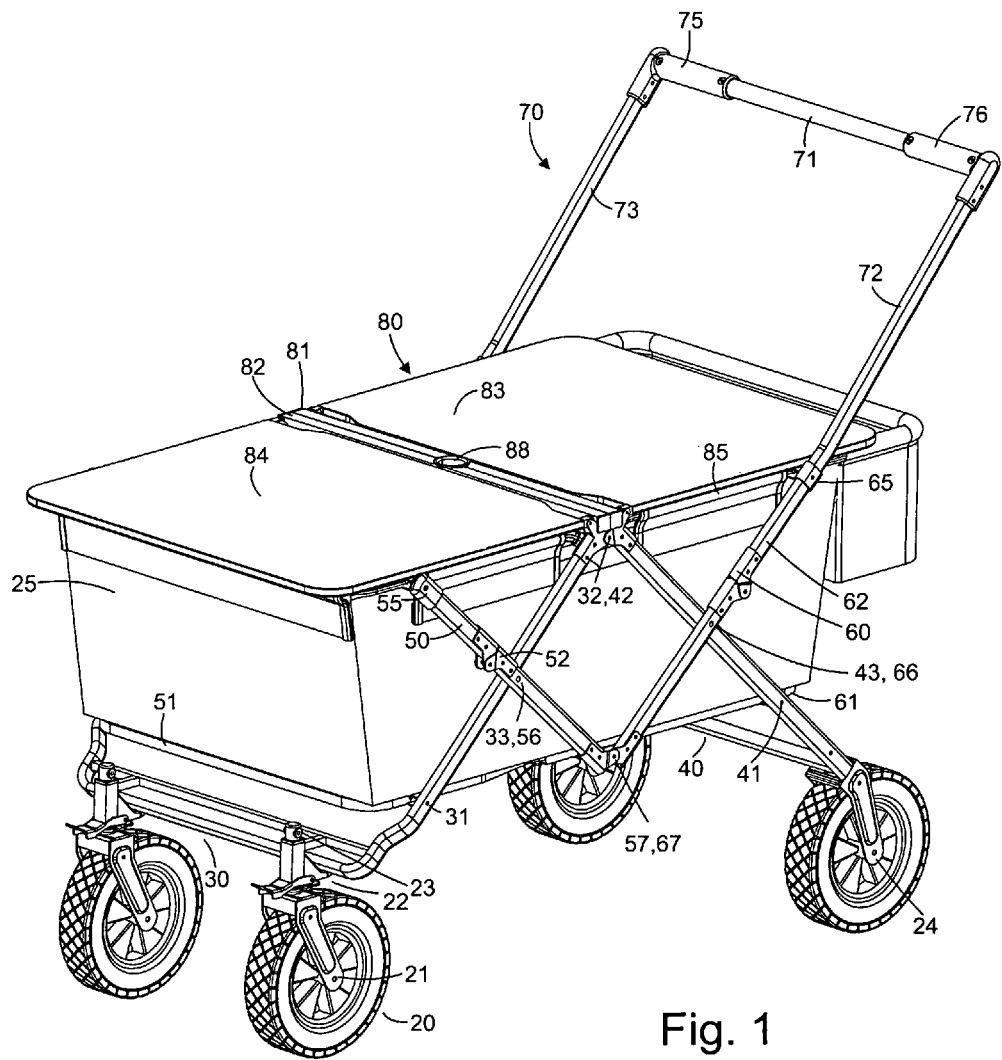
FIG. 1 is a front right perspective view of the present invention in cart configuration with the fabric enclosure installed.
Figure 2:
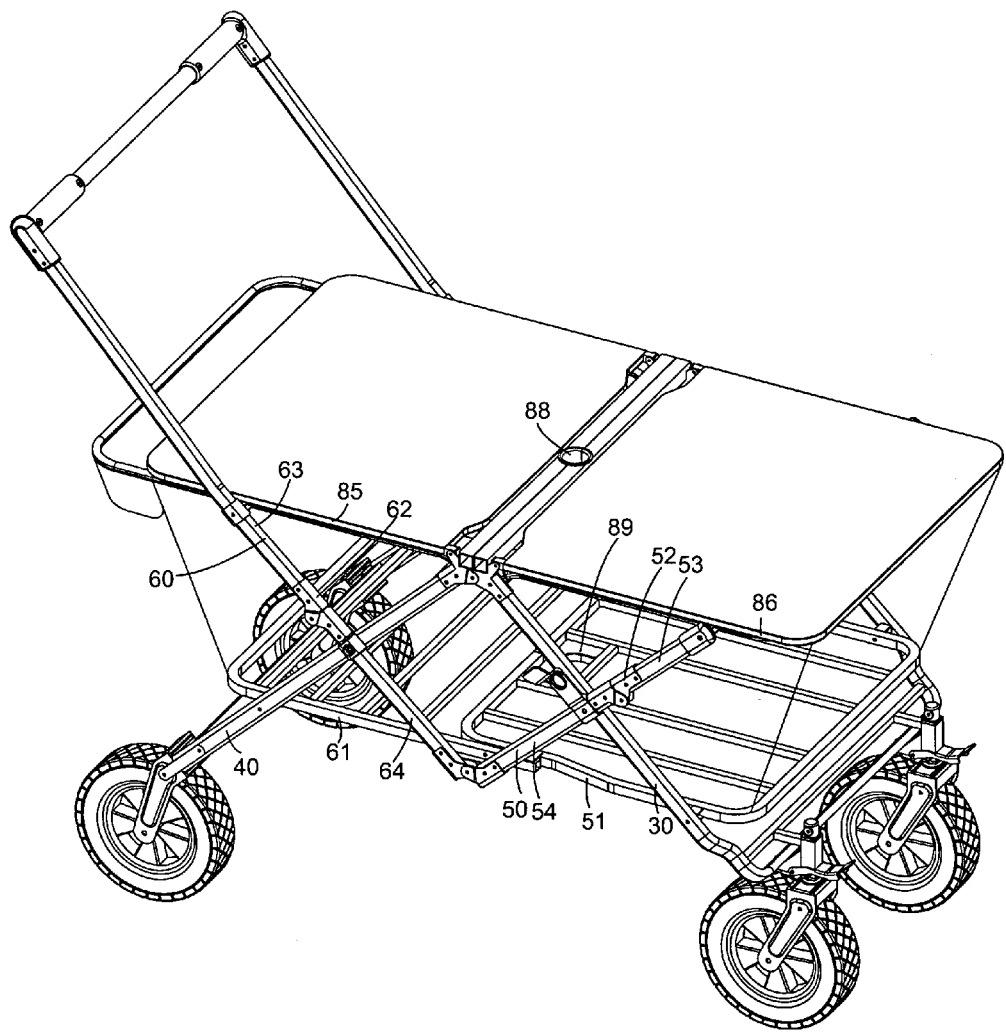
FIG. 2 is a front left perspective view of the present invention in cart configuration with the fabric enclosure uninstalled.
Figure 3:
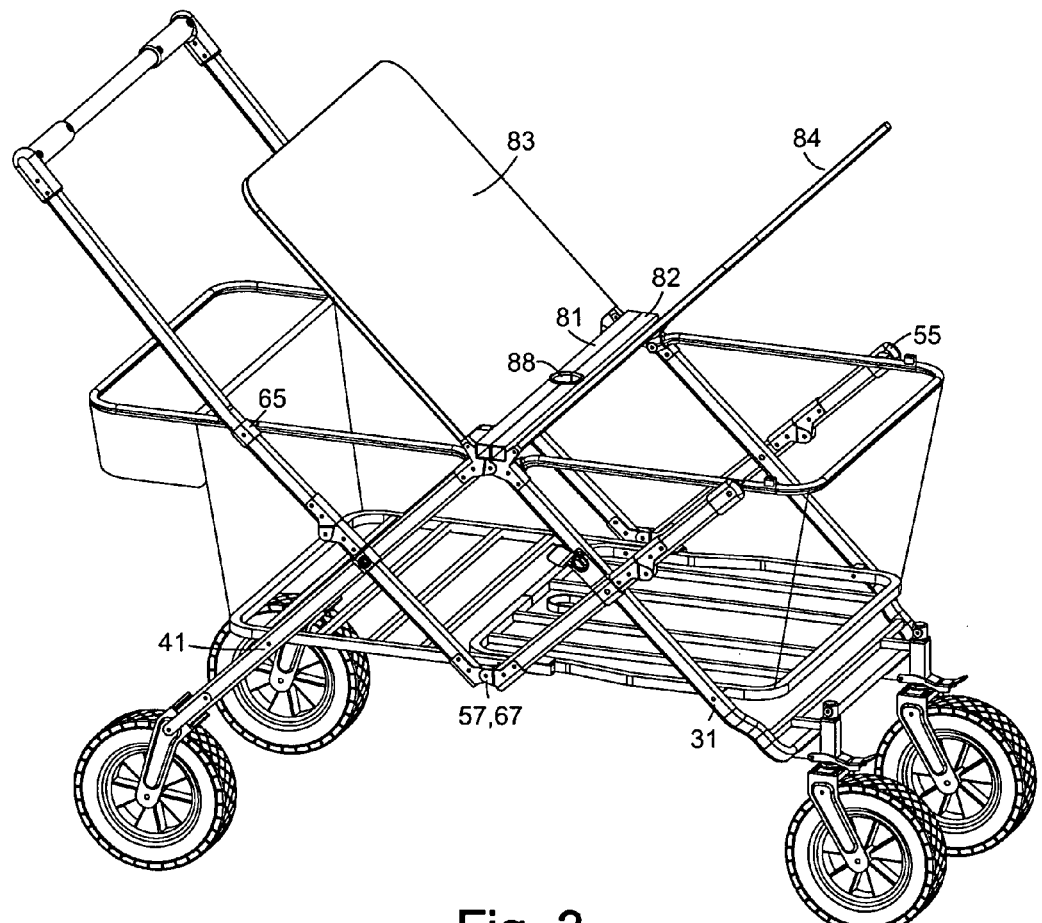
FIG. 3 is a side perspective view of the present invention with the first table leaf and the second table leaf raised.
Figure 4:
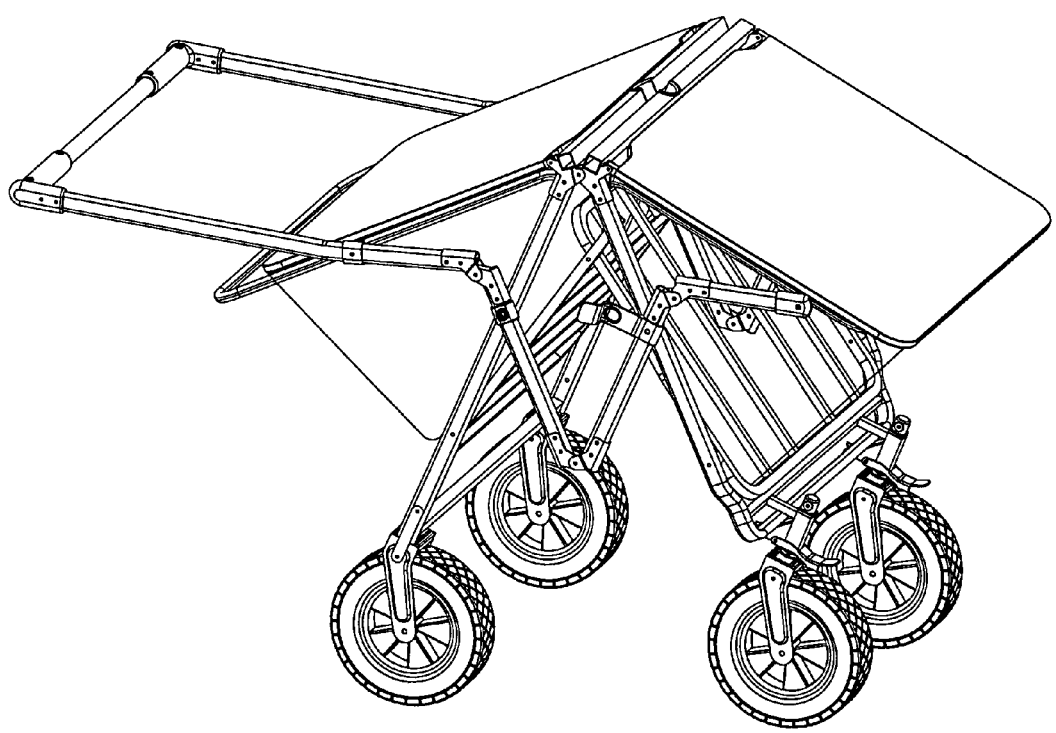
FIG. 4 is a perspective view of the present invention in transition from the cart configuration to a folded configuration.
Figure 5:
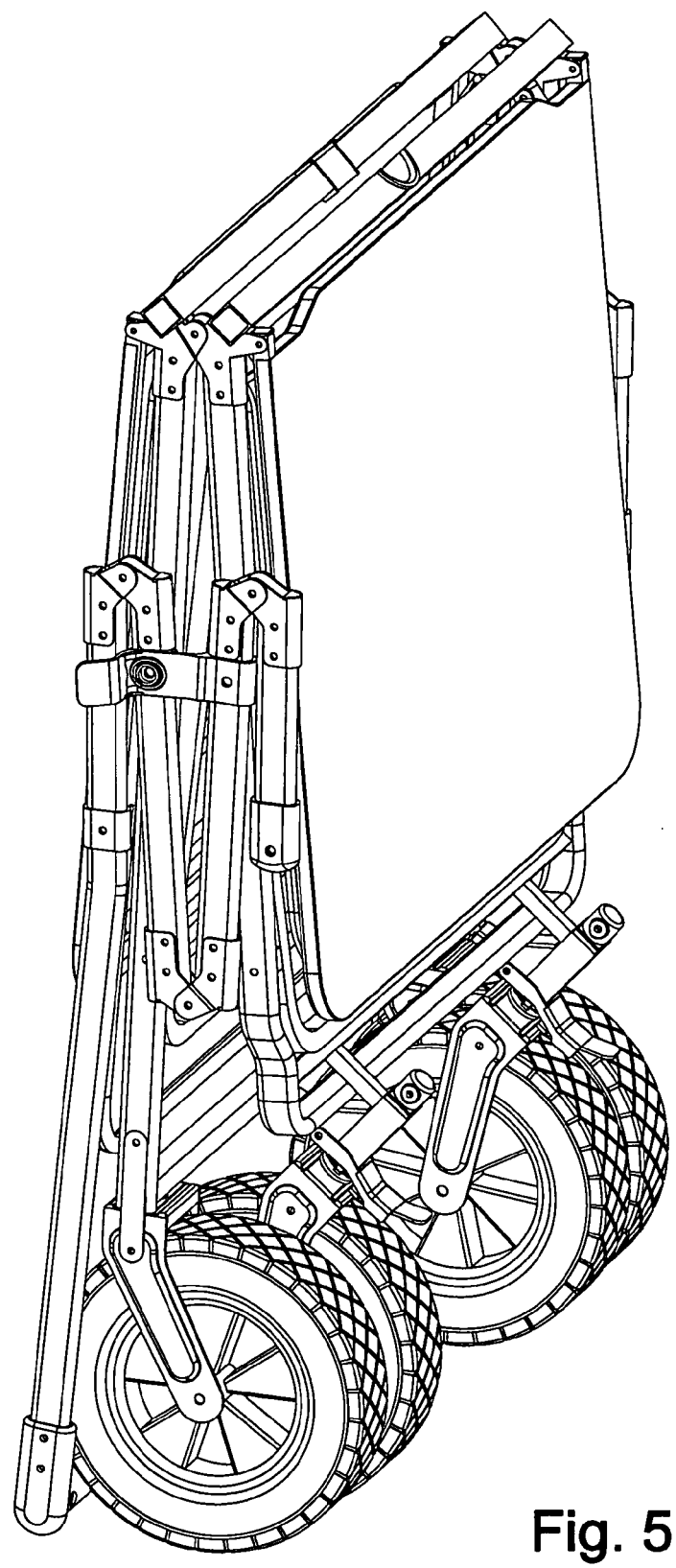
FIG. 5 is a side perspective view of the present invention in folded configuration.
Figure 6:
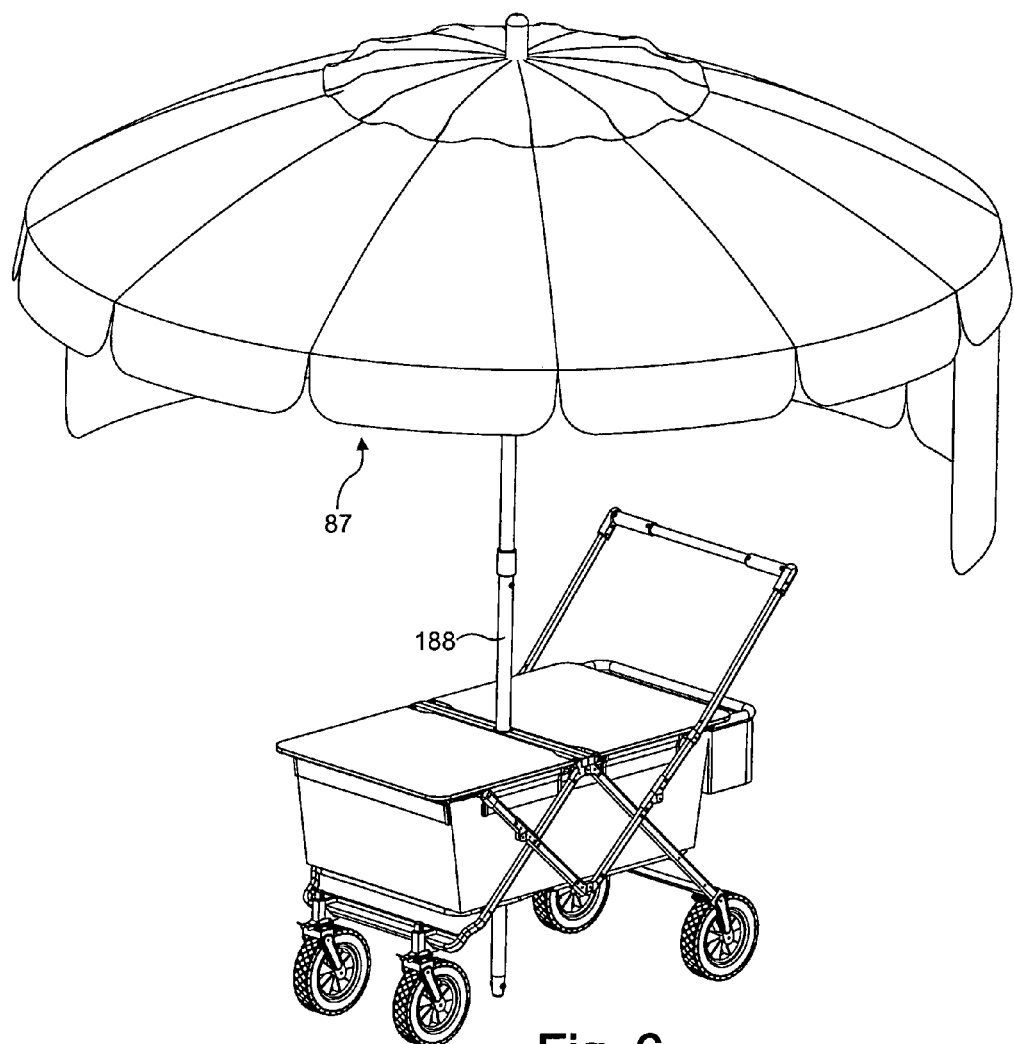
FIG. 6 is a perspective view of the present invention in the umbrella configuration with the fabric enclosure installed showing the installation of the umbrella.
Figure 7:
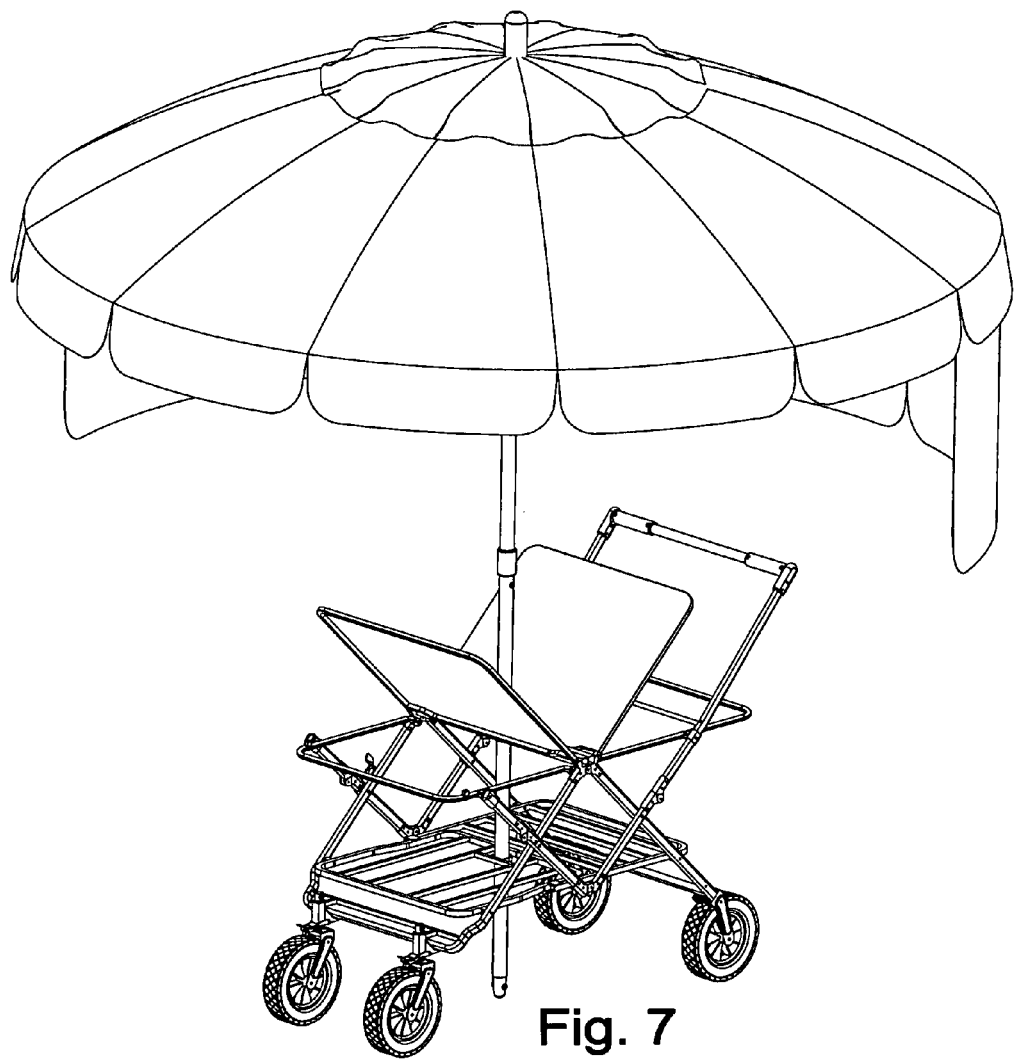
FIG. 7 is a perspective view of the present invention in the umbrella configuration with the fabric enclosure uninstalled.
Figure 8:
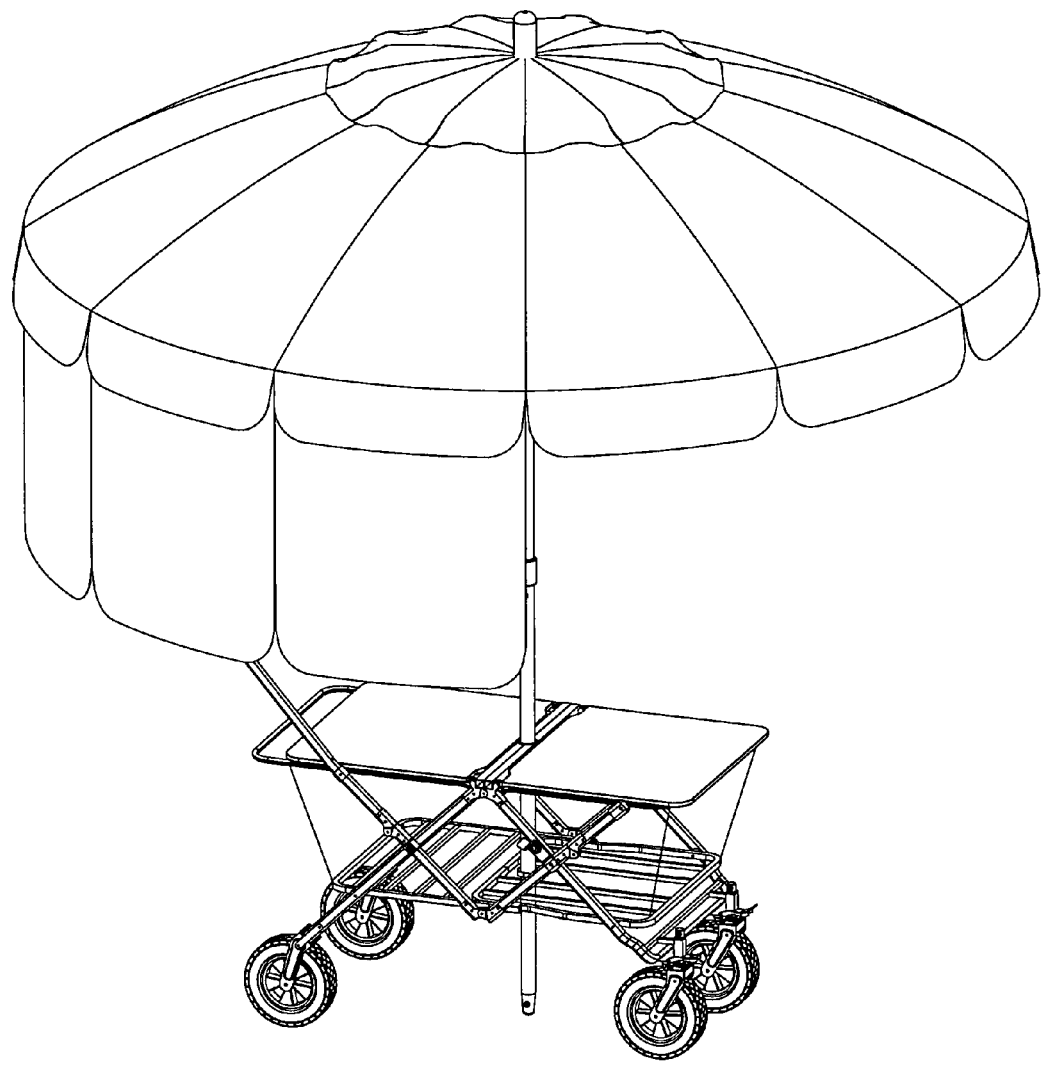
FIG. 8 is a side perspective view of the present invention with the fabric enclosure uninstalled showing the umbrella downwardly engaged.
Figure 9:
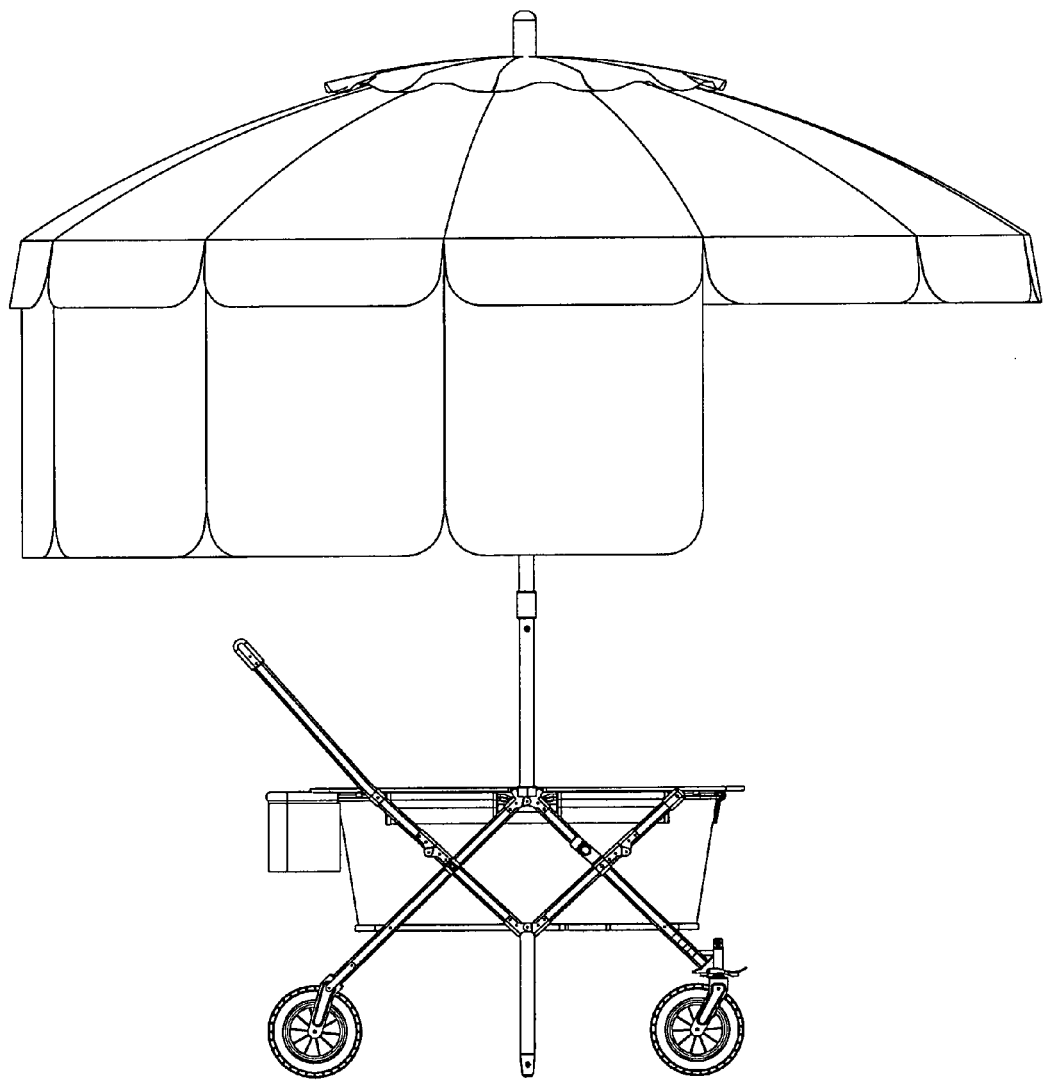
FIG. 9 is a side view of the present invention with the fabric enclosure installed showing the umbrella downwardly engaged.

The following call out list of elements can be a useful guide in referencing the elements of the drawings.
20 Wheel
21 Front Wheel Axle
22 Wheel Latch
23 Wheel Pivot
24 Rear Wheel Axle
25 Fabric Enclosure
30 Front Wheel Frame
31 Front Wheel Frame Lower Hinge
32 Front Wheel Frame Upper Hinge
33 Front Wheel Frame Middle Hinge
41 Rear Wheel Frame Lower Hinge
42 Rear Wheel Frame Upper Hinge
43 Rear Wheel Frame Middle Hinge
50 Front Basket Frame
51 Front Basket Floor Frame 52 Front Basket Frame Hinge
53 Front Basket Frame Upper Section
54 Front Basket Frame Lower Section
55 Basket Frame Upper Hinge
56 Front Basket Frame Middle Hinge
57 Front Basket Frame Lower
60 Rear Basket Frame
61 Rear Basket Floor Frame
62 Rear Basket Frame Hinge
63 Rear Basket Frame Upper Section
64 Rear Basket Frame Lower Section
65 Rear Basket Frame Upper Hinge
66 Rear Basket Frame Middle Hinge
67 Rear Basket Frame Lower Hinge
70 Handle Frame
71 Handle Crossbar
72 Left Handle Frame Extension Member
73 Right Handle Frame Extension Member
75 Right Handle Grip Connector
76 Left Handle Grip Connector
81 First Table Support
82 Second Table Support
83 First Table Leaf
84 Second Table Leaf
85 First Table Leaf Frame Support
86 Second Table Leaf Frame Support
87 Umbrella
88 Upper Umbrella Mast Opening
89 Lower Umbrella Mast Opening
188 Umbrella Mast

DETAILED DESCRIPTION OF THE PREFERRED EMBODIMENT

The umbrella folding table cart has a total four different configurations. The first configuration is as a pushcart without the table. The second configuration is a pushcart with the table installed as a cover for the pushcart basket. The third configuration is a table cart with the umbrella installed to provide shade for user while the user pushes the table cart. The user can use the table cart with umbrella at the beach for selling food for example. The fourth configuration is a canopy where the canopy clips onto a rear portion of the table cart.

The folding cart has a frame supported by wheels 20. The folding cart has a pair of rear wheel axles and a pair of front wheel axles. A pair of front wheels have a pair of front wheel axles 21 and a pair of rear wheels have a pair of rear wheel axles 24. The front wheels are steerable and can pivot on a wheel pivot 23. Each of the front wheels are individually pivotable about their respective wheel pivot. The folding cart has a pair of wheel pivots. The wheel pivots can be locked into a non-steerable position by a pair of wheel latches 22. The folding cart has a pair of wheel latches 22, namely a right wheel latch for the right front wheel and a left wheel latch for the left front wheel. The wheels support the frame and a fabric enclosure 25 is fitted around the frame. The front wheels are secured to a front wheel frame 30 and the rear wheels are secured to a rear wheel frame 40.

The front wheel frame 30 is pivotally secured to the front basket floor frame 51 at a front wheel frame lower hinge 31. The front wheel frame lower hinge 31 is a pivot joint that can be formed when the front wheel frame lower hinge is riveted or bolted to the front basket floor frame 51 at the front wheel frame lower hinge 31. Alternatively, a wire or pin can connect the front basket floor frame 51 to the front wheel frame 30. The front wheel frame middle hinge 33 is above the front wheel frame lower hinge 31. The front wheel frame upper hinge 32 provides a pivot joint between the second table leaf frame support 86 and the front wheel frame 30. The front wheel frame middle hinge 33 provides a pivot joint between the front basket frame 50 and the front wheel frame 30.

Similarly, the rear wheel frame 40 is jointed to the rear basket floor frame 61 at the rear wheel frame lower hinge 41. The rear wheel frame middle hinge 43 is above the rear wheel frame lower hinge 41, and the rear wheel frame upper hinge 42 is above the rear wheel frame lower hinge 41. The rear wheel frame upper hinge 42 provides a joint between the first table leaf frame support 85 and the rear wheel frame 40. The rear basket frame 60 is jointed to the rear wheel frame 40 at the rear wheel frame middle hinge 43.

The front basket frame 50 supports the second table leaf support 86 and the fabric enclosure 25 forms a basket that has a sleeve which at least partially receives the second table leaf frame support 86. The second table leaf frame support 86 is U-shaped and has a pair of ends facing a middle portion of the cart. The front wheel frame 30 is also U-shaped having a pair of ends facing a middle portion of the cart. The pair of ends of the second table leaf frame support 86 and the pair of ends of the front wheel frame 30 are both hinged to the second table support 82. The second table support 82 is preferably a hollow tubular steel member having a square cross-section and a pair of plastic end caps. The upper umbrella mast opening 88 is formed between the second table support 82 and the first table support 81. The front wheel frame upper hinge 32 can be coincidental with the rear wheel frame upper hinge 42. Alternatively, they can be spaced apart slightly.

The rear basket frame 60 is jointed to the first table leaf frame support 85 at the rear basket frame upper hinge 65. The rear basket frame 60 is jointed to the rear wheel frame 40 at the rear wheel frame lower hinge 41. The rear basket frame 60 is jointed to the rear basket floor frame 61 at the rear wheel frame middle hinge 43. The rear basket frame lower hinge 67 can be coincidental and the same hinge as the front basket frame lower hinge 57, or alternatively they can be spaced apart slightly.

The rear basket frame 60 has a rear basket frame hinge 62. A rear basket frame hinge 62 provides an upward breaking joint to allow folding, because otherwise the rear basket frame 60 would be locked into position since the rear wheel frame upper hinge 42 provides a pivot joint between the first table leaf frame support 85 and the rear wheel frame 40, and the rear wheel frame 40 is pivot jointed to the rear basket frame 60 at the rear basket frame middle hinge 66, and the rear basket frame upper hinge 65 forms a joint between the first table leaf frame support 85 and the rear basket frame 60. The rear basket frame hinge 62 is above the rear wheel frame middle hinge 43 and below the rear basket frame upper hinge 65. The rear basket frame hinge 62 allows rotation of an upper portion of the rear basket frame 60 in a clockwise direction relative to the lower portion of the rear basket frame 60.

The rear basket frame hinge 62 has a locked position providing a straight rear basket frame 60 member. The rear basket frame hinge 62 allows the upper portion of the rear basket frame to fold downward while the lower portion of the rear basket frame folds upward. The rear basket frame hinge 62 has a folded position where the upper portion of the rear basket frame is folded approximately 180° to be parallel again to the lower portion of the rear basket frame from an original collinear orientation.

Similarly, the front basket frame 50 has a front basket frame hinge 52. The front basket frame hinge 52 allows the upper portion of the front basket frame 50 rotate in a counterclockwise direction from the lower portion of the front basket frame 50. The front basket frame hinge 52 has a locked position providing a straight front basket frame 50. The front basket frame hinge 52 can rotate to a folded position where the upper portion of the front basket frame 50 folds downward while the lower portion of the front basket frame 50 folds upward. Similarly, the front basket frame hinge 52 has a folded position where the upper portion of the front basket frame is folded approximately 180° to be parallel again to the lower portion of the front basket frame from an originally collinear orientation.

The first table leaf support 85 is originally coplanar to the second table leaf support 86 in a deployed position. As the cart folds, the first table leaf support 85 and the second table leaf support 86 are both folded up so that they are generally parallel to each other and offset by a small distance which is approximately the diameter of an umbrella mast.

The upper umbrella mast opening 88 is preferably a circular opening and opposite a lower umbrella mast opening 89. The lower umbrella mast 89 is formed on a portion of the rear basket floor frame 61 or the front basket floor frame 51. Either the rear basket for frame 61 or the front basket for frame 51 extends below the upper umbrella mast opening 88 to provide a mounting location for the lower umbrella mast 89 which is preferably directly below the upper umbrella mast opening 88.

The handle frame 70 is preferably an extension of the rear basket frame 60. The handle frame 70 is a part of the rear basket frame 60. The handle frame 70 has a left handle frame extension member 72 and a right handle frame extension member 73. A handle crossbar 71 joins the left handle frame extension member 72 to the right handle frame extension member 73. The handle crossbar 71 can be connected to the right handle frame extension member 73 at a right handle grip connector 75 which can be a plastic connector. Preferably, the right handle grip connector 75 has a cylindrical shaped grip. Similarly, the left handle grip connector 76 can connect to the handle crossbar 71 to the left handle frame extension member 72. A handle crossbar 71 allows a user to grip the handle frame 70.

During folding, the front wheel frame 30 folds toward the rear wheel frame 40 until both are relatively parallel to each other. The front wheel frame 30 begins at a diagonal angle and the rear will frame 40 begins at a diagonal angle and both fold downwards together until they are both generally vertical. During folding, the first table leaf 83 and the second table leaf 84 are generally flat and both fold upwards together until they are both generally vertical. The front basket frame 50 and the rear basket frame 60 both have a lower portion that begin at diagonal angles, but fold together to a generally vertical position.

Alternatively, the first table support 81 and the second table support 82 can be detached from the frame so that the cart can be converted to a cart configuration from a card table configuration. The handle frame 70 portion of the rear basket frame 60 folds downward to a generally vertical position. The front wheels and the rear wheels fold together and are offset so that the front wheels fit between the rear wheels.

Preferably, a latch can secure the folding cart in a folded position. A latch can be placed between the lower portion of the rear basket frame 60 and the lower portion of the front basket frame 50 so that the lower portion of the rear basket frame 60 engages with the lower portion of the front basket frame 50 thereby locking the folding cart into a folding position.

An umbrella 87 provides a shade for the user and is mounted on the umbrella mast 188. The umbrella mast 88 fits through the upper umbrella mast opening 88. The umbrella 87 can be mounted so that a lower tip of the umbrella mast does not touch the ground. This allows the umbrella 87 to travel with the cart while the cart is moving.

The fabric enclosure 25 preferably has several sleeves that engage the first table leaf support 85 and the second table leaf support 86. The sleeves of the fabric enclosure 25 preferably are disposed around an upper periphery of the fabric enclosure 25, but below the first table leaf 83 and the second table leaf 84. Thus, the fabric enclosure sleeves can provide a softer buffer between the table and the frame so that the table does not rattle when the cart travels over rough ground. The lower surface of the first table leaf support 85 and the lower surface of the second table leaf support 86 engage an upper surface of the sleeves of the fabric enclosure 25.

When the front basket frame hinge 52 and the rear basket frame hinge 62 are closed in the deployed position of the cart, the lower end of the upper portion of the front basket frame abuts the upper end of the lower portion of the front basket frame to limit rotation to 180° and to provide a generally collinear relationship between the upper portion of the front basket frame in the lower portion of the front basket frame. Similarly, the rear basket frame hinge 62 has a lower end of the upper portion of the rear basket frame that abuts and upper end of the lower portion of the rear basket frame to limit rotation to 180° and to provide a generally collinear relationship between the upper portion of the rear basket frame and the lower portion of the rear basket frame.

The front basket frame hinge and the rear basket frame hinge have a pivot axis that is offset from the frame member. The front basket frame hinge pivot axis and the rear basket frame hinge pivot axis are both preferably below an axis of the front basket frame and an axis of the rear basket frame. The front basket frame hinge pivot axis is on a lower edge of the front basket frame and the rear basket frame hinge pivot axis is on a lower edge of the rear basket frame.

To fold up the umbrella folding table card, user needs to pull up from the front basket frame lower section 54 or the rear basket frame or section 64 so that the frame lower section folds in half from a generally horizontal position to a generally vertical position rotating approximately 90° between the stowed and deployed positions.

The mast of the umbrella can have openings in it with stopper pins so that the stopper pins engage the upper umbrella mast opening 88 or the lower mast opening 89. The stopper pins may allow a user to adjust the height of the umbrella relative to the ground.

The table support can be formed of a first table support portion and a second table support portion. The first table support portion and the second table support portion can be a pair of parallel square cross-section beams of light gauge tubular steel.

The invention claimed is:

1. A folding cart having a deployed position and a folded position comprising:
    four wheels including a pair of front wheels and a pair of rear wheels;
    a first table leaf, and a second table leaf hinged to each other at a table support;
    a frame including a front wheel frame connected to the pair of front wheels and a rear wheel frame connected to the pair of rear wheels, wherein the front wheel frame is hinged to the rear wheel frame at a front wheel frame upper hinge, wherein the front wheel frame and the rear wheel frame have a hinged connection relative to each other;

a first table leaf frame support and a second table leaf frame support that respectively supported the first table leaf and the second table leaf, wherein the first table leaf frame support is generally horizontal in the deployed position, and wherein the second table leaf frame support is generally horizontal in the deployed position, wherein the first table the frame support and the second table leaf frame support fold towards each other downwardly to a more vertical orientation when the folding cart is folded from the deployed position to the folded position;

a front basket frame and a rear basket frame, wherein the front basket frame has a hinged connection relative to the rear basket frame, wherein the front basket frame is hinged to the front wheel frame at a front wheel frame middle hinge, wherein the rear basket frame is hinged to the rear wheel frame at a rear wheel frame middle hinge, wherein the front basket frame is hinged to the second table leaf frame support at a front basket frame upper hinge, and wherein the rear basket frame is hinged to the first table leaf frame support at a rear basket frame upper hinge;

a rear basket frame hinge formed on the rear basket frame and located between the rear wheel frame middle hinge and the rear basket frame upper hinge, wherein the rear basket frame hinge folds so that the upper portion of the rear basket frame folds downward while a lower portion of the rear basket frame folds upward until the upper portion of the rear basket frame is more parallel to the lower portion of the rear basket frame;

a front basket frame hinge formed on the front basket frame and located between the front wheel frame middle hinge and the front basket frame upper hinge, wherein the front basket frame hinge folds so that the upper portion of the front basket frame folds downward while a lower portion of the front basket frame folds upward until the upper portion of the front basket frame is more parallel to the lower portion of the front basket frame; and a floor frame that includes a front basket floor frame and a rear basket floor frame, wherein the front basket floor frame is pivotally connected to the rear basket floor frame at a front basket frame lower hinge or at a rear basket frame lower hinge, wherein the front basket floor frame is pivotally connected to the front wheel frame at a front wheel frame lower hinge, wherein the front wheel frame lower hinge is below the front wheel frame middle hinge, which is below the front wheel frame upper hinge, wherein the rear basket for frame is pivotally connected to the rear wheel frame at a rear wheel frame lower hinge wherein the rear wheel frame lower hinge is below the rear wheel frame middle hinge which is below the rear wheel frame upper hinge.

2. The folding cart of claim 1, wherein the table support further includes an upper umbrella mast opening configured to retain a mast of an umbrella.

3. The folding cart of claim 2, wherein the front basket frame lower section further includes a lower umbrella mast opening configured to retain the mast of an umbrella.

4. The folding cart of claim 1, wherein the pair of front wheels are mounted to the front wheel frame at a pair of wheel pivots, namely a right wheel pivot and a left wheel pivot, wherein the pair of wheel pivots provides pivotal rotation for steering of the folding cart.

5. The folding cart of claim 4, wherein a pair of wheel latches, namely a right wheel latch and a left wheel latch are configured to lock the steering of the folding cart by preventing pivoting of the pair of front wheels.

6. The folding cart of claim 1, further including a handle frame extending from the rear basket frame.

7. The folding cart of claim 6, wherein the handle frame has a right handle grip connector connecting a handle crossbar to a right handle frame extension member, and wherein the hollow frame also has a left handle grip connector connecting the handle crossbar to a left handle frame extension member.

8. The folding cart of claim 1, wherein the front wheel frame is U-shaped having a pair of front wheel frame upper ends and wherein the rear wheel frame is U-shaped having a pair of rear wheel frame upper ends, wherein the pair of front wheel frame upper ends is pivotally connected to the pair of rear wheel frame upper ends.

9. The folding cart of claim 8, wherein a table support connecting between the pair of front wheel frame upper ends and between the pair of rear wheel frame upper ends is detachable from the frame, wherein the table support is formed of a first table support portion and a second table support portion, wherein the first table leaf is hinged to the first table support portion and wherein the second table leaf is hinged to the second table support portion.

10. The folding cart of claim 9, wherein the table support further includes an upper umbrella mast opening configured to retain a mast of an umbrella.

11. The folding cart of claim 10, wherein the front basket frame lower section further includes a lower umbrella mast opening configured to retain the mast of an umbrella.

12. The folding cart of claim 9, wherein the pair of front wheels are mounted to the front wheel frame at a pair of wheel pivots, namely a right wheel pivot and a left wheel pivot, wherein the pair of wheel pivots provides pivotal rotation for steering of the folding cart.

13. The folding cart of claim 12, wherein a pair of wheel latches, namely a right wheel latch and a left wheel latch are configured to lock the steering of the folding cart by preventing pivoting of the pair of front wheels.

14. The folding cart of claim 9, further including a handle frame extending from the rear basket frame.

15. The folding cart of claim 14, wherein the handle frame has a right handle grip connector connecting a handle crossbar to a right handle frame extension member, and wherein the hollow frame also has a left handle grip connector connecting the handle crossbar to a left handle frame extension member.

* * * * *